United States Patent
Waller

[15] 3,649,819
[45] Mar. 14, 1972

[54] VECTOR GENERATOR FOR RECTANGULAR CARTESIAN COORDINATE POSITIONING SYSTEM

[72] Inventor: Robert W. Waller, Northridge, Calif.
[73] Assignee: Information International, Inc., Boston, Mass.
[22] Filed: Oct. 12, 1970
[21] Appl. No.: 79,735

[52] U.S. Cl. ..........................235/151, 178/DIG. 22, 315/18, 315/19, 340/324 A
[51] Int. Cl. ........................................G06f 3/14, G06k 15/18
[58] Field of Search ..............178/DIG. 22; 235/151 PL, 198; 315/18, 19; 340/324 A

[56] References Cited

UNITED STATES PATENTS 3,320,409    5/1967    Larrow..............................235/151 PL Primary Examiner—Malcolm A. Morrison
Assistant Examiner—R. Stephen Dildine, Jr.
Attorney—Lindenberg, Freilich & Wasserman

[57] ABSTRACT

A vector generator in a rectangular Cartesian coordinate positioning system for X- and Y-deflection control of a cathode-ray tube is disclosed using the following information provided by a programmable data processor: (1) maximum ramp signal magnitude of larger vector component; (2) sign of larger vector component; (3) ratio of smaller to larger vector component; (4) sign of smaller vector component; and (5) indication as to which of the components is the largest. A large linear ramp signal is generated at a predetermined rate and routed to the deflection control channel for the larger component with proper polarity as a function of information items 2 and 5. A small linear ramp signal is derived from the large linear ramp signal by multiplying the latter by item 3, and is applied to the deflection control channel of the smaller component with proper polarity as a function of items 4 and 5. The duration of both ramp signals is controlled by turning off the ramp generator when the magnitude of the large ramp signal reaches the value of item 1, thereby providing programmed control of vector length. Item 3 is decoded to select a rate for the ramp signal that approximates a constant beam deflection velocity for all vectors.

10 Claims, 4 Drawing Figures

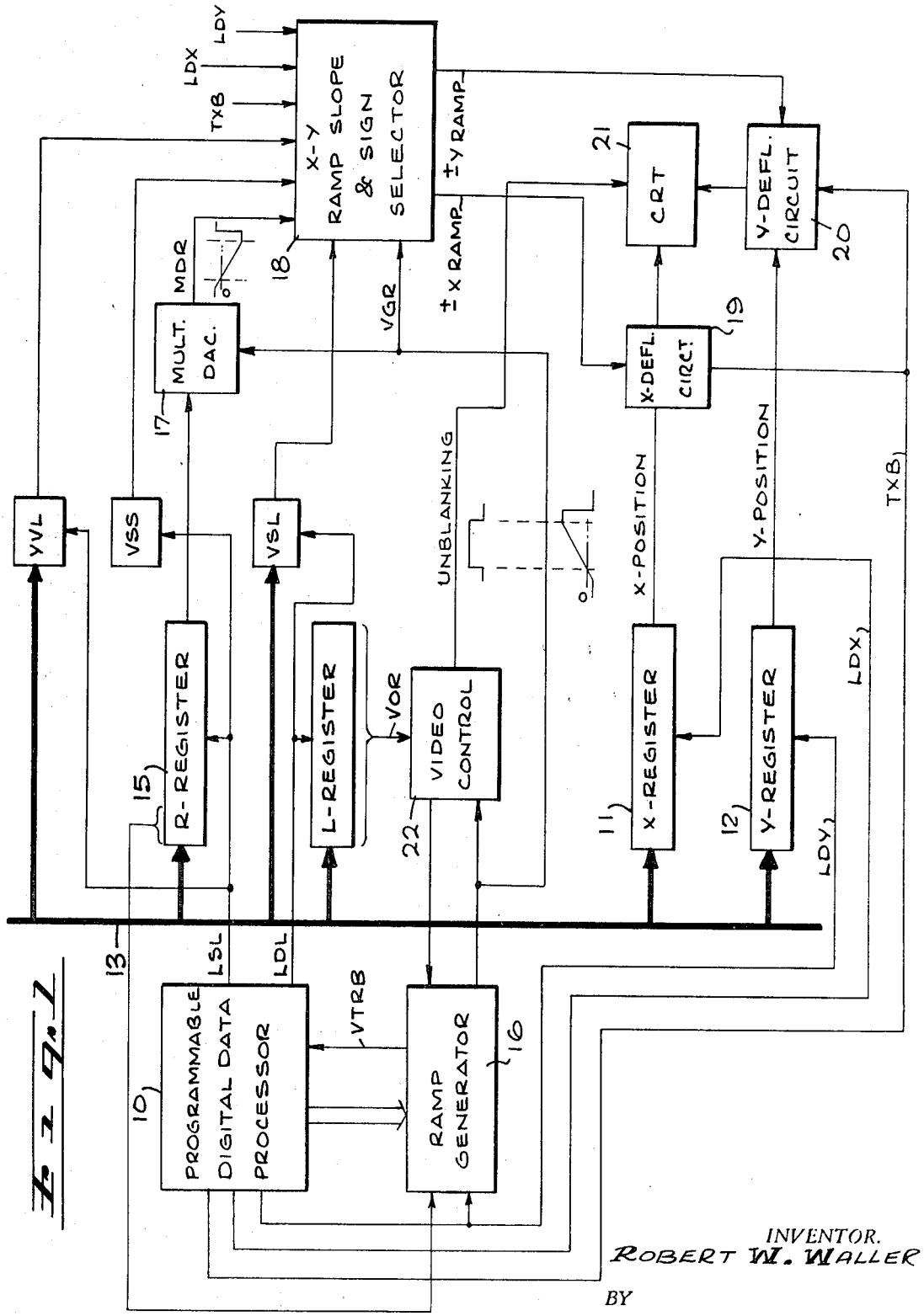

VECTOR GENERATOR FOR RECTANGULAR CARTESIAN COORDINATE POSITIONING SYSTEM

BACKGROUND OF THE INVENTION

This invention relates to improvements in an electronic vector generator for rectangular Cartesian coordinate positioning systems, and more particularly to a novel and improved system for providing ramp signals, each of proper slope, polarity and duration, for a specified vector.

Various techniques have been employed to generate analog vector control signals for rectangular Cartesian coordinate positioning systems, such as systems commonly used to display line segments on a cathode-ray tube. In general, two independent and synchronized ramp signals are generated in X- and Y-multiplying digital-to-analog converters (DAC's) from a reference ramp signal, and provided to control the X- and Y-deflection circuits in accordance with the signs and magnitudes of specified vector components.

The apparent intensity of a vector displayed on the face of a CRT is inversely proportional to the beam deflection speed. Accordingly, to obviate the need for controlling the electron beam intensity, it is necessary to maintain beam speed substantially constant for all vectors. That is generally done by deriving from component ramp signals $X_s$ and $Y_s$, a signal S proportional to the square root of the sum of $X_s^2$ and $Y_s^2$, and using the derived signal to so control the rate of the reference ramp signal that the signal S is maintained at a constant level. However, in practice such analog control loops are expensive and have been found to be unstable, or at best only conditionally stable.

It would be desirable to generate vector component ramps from a reference ramp with only one multiplying DAC using vector information provided by a programmable digital data processor, and to control beam deflection speed directly from the vector information.

SUMMARY OF THE INVENTION

An object of the invention is to provide a system for controlling the movement of an element along a vector in a rectangular Cartesian coordinate system starting at a designated point, all as a function of the magnitude and sign of the larger of two rectangular Cartesian components of the vector, the ratio of the smaller component S to the larger component L, the sign of the smaller component and an indication as to the axis of the larger component. Another object is to maintain the speed of the element in such a system approximately constant.

Another object of the invention is to provide a vector generator for a cathode-ray tube, or similar plotting device, in which X- and Y-ramp voltages are to be generated to control the display of a line along a vector from a starting point in rectangular Cartesian coordinate system using a reference ramp signal generator and a single multiplying digital-to-analog converter to generate X- and Y-ramp signals of proper polarities and relative slopes for vector components in any quadrant from the starting point. Still another object is to maintain the beam deflection speed in such a display system approximately constant.

Briefly, in accordance with the present invention, X- and Y-static registers are provided to store the Cartesian coordinates of starting point for initially positioning an element, such as an electron beam in a cathode-ray tube, through X- and Y-axis deflection control circuits. Two additional static storage means store digital control information to move the element along a vector of specified length from the starting point. One of the storage means stores the magnitude of the larger vector component and the other stores the ratio of the smaller vector component to the larger vector component. Additional means are provided to store in digital form information from the programmable processor indicating the quadrant of the vector from its starting point, and to store an indication of the axis of the larger component.

A linear reference ramp generator is started under control of the programmable processor. The output of the ramp generator is a voltage signal which increases in a positive direction from a level slightly below zero at a predetermined constant rate. A multiplying digital-to-analog converter (DAC) multiplies the reference ramp signal with the ratio stored in one of the static registers. The rate of change or slope of the output of the multiplying DAC is then smaller than the rate of the reference ramp signal. The two ramp signals are at all times applied to a ramp and sign selector having a logic network for selecting the signs of the two ramp signals and switching the two ramp signals appropriately to the X- and y-deflection control circuits where they are added to respective coordinates in analog form of the starting points stored in X- and Y-registers (in digital form). A display control signal, such as an unblanking signal for a cathode-ray tube, is generated from the time the reference ramp signal crosses zero until it exceeds the value of the larger vector component.

To maintain beam deflection speed constant for any programmed vector, the ratio of the smaller to the larger vector component is decoded to so control the rate of the reference ramp generator that beam deflection speed is approximately constant. The degree to which speed is made to approximate the predetermined constant may be increased virtually without limit.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a block diagram of a novel vector generator constructed according to the present invention.

FIG. 4 is a logic diagram of a ramp and sign selector for X- and Y-channels in a preferred embodiment of the system illustrated in FIG. 1.

DESCRIPTION OF THE PREFERRED EMBODIMENT

Figure 3:
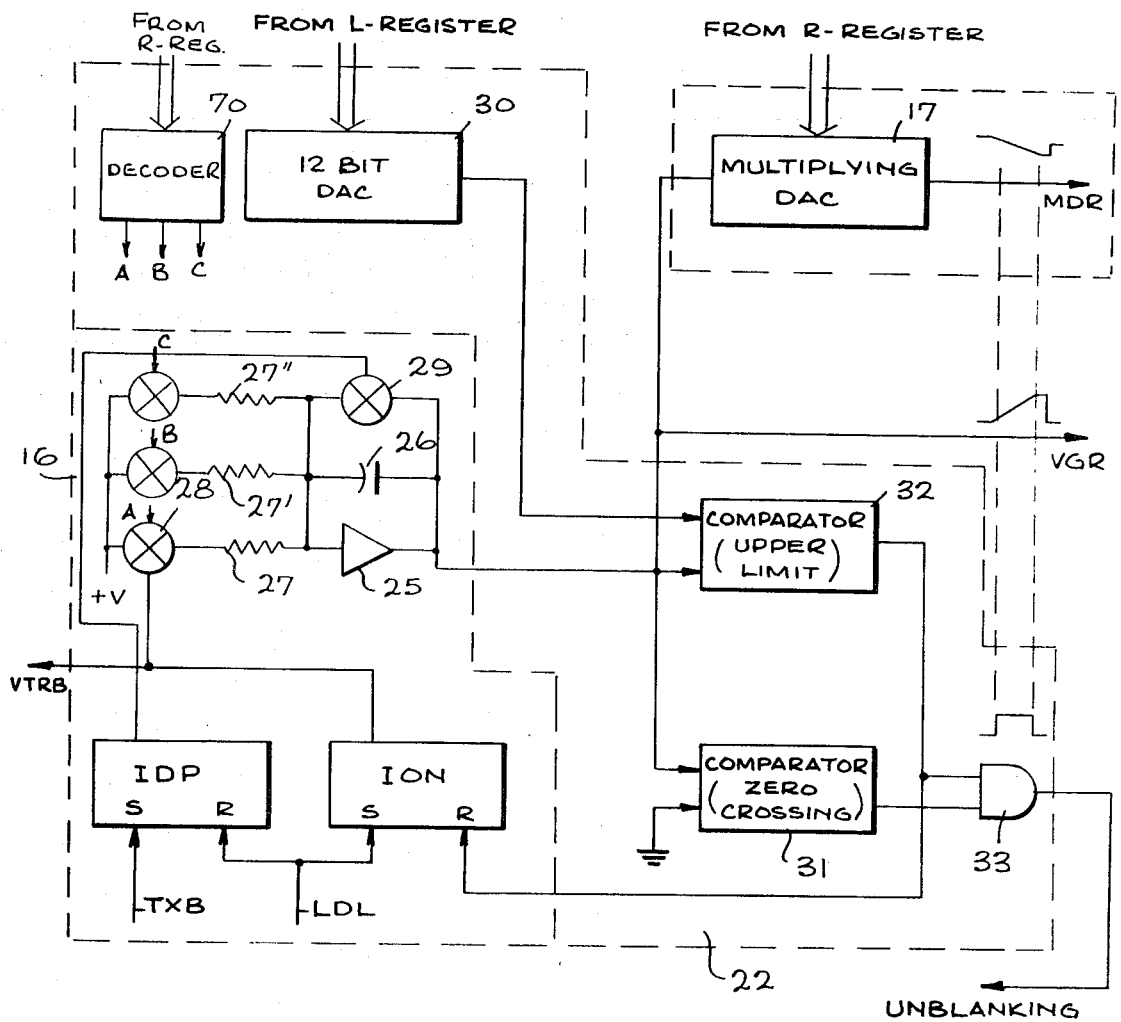
FIG. 3 is a diagram of the vector ramp generator and video control unit in a preferred embodiment of the system illustrated in FIG. 1.

In accordance with the present invention, a vector to be displayed on a cathode-ray tube (CRT) from a starting point (X, Y) is specified by two numbers, one representing the magnitude and sign of the larger component L of the vector and the other specifying the ratio (R=S:L) of the magnitude of the smaller component S to the magnitude of the larger component L.

The starting point for the vector is specified by a programmable data processor 10, such as a general or special purpose digital computer. The X- and Y-coordinates of the starting point are entered in static X- and Y-registers 11 and 12 through a bus 13. The end point components of the vector are also specified by the processor 10, but only the magnitude of the larger component is entered in a static L register for use in generating the vector. The sign of the larger component is entered in a flip-flop VSL.

The processor 10 determines the ratio R of the smaller component S to the larger component L, and enters that ratio in a 12-bit static R-register 15. The sign of the smaller component is entered in a flip-flop VSS. A control signal for the larger component is derived from a reference ramp signal VGR generated by a ramp generator 16. A control signal for the smaller component of the vector is then developed, in accordance with the present invention, by multiplying the reference ramp signal from the ramp generator 16 by the ratio R in a multiplying digital-to-analog converter DAC 17. The multiplying DAC is a ladder-type digital-to-analog converter having a variable reference voltage controlled by the ratio R such that at any given time the ramp signal MDR for the smaller component is equal to eR, where e is the instantaneous voltage level of the ramp signal VGR taken directly from the ramp generator 16.

Since the ratio R is limited to a value equal to or less than 1, the absolute value of the slope of the ramp signal MDR for the smaller component will always be smaller and in proper proportion to the magnitude of the larger component. However, it should be noted that while the reference ramp signal VGR from the ramp generator 16 is increasing from a slightly negative value and passing through zero, the ramp signal MDR for the smaller component is decreasing from a positive value and passing through zero because, in practice, the multiplying DAC is implemented with an inverting operational amplifier at the output of a ladder-type digital-to-analog converter. The scaled-down ramp signal MDR from the multiplying DAC is then also increasing from the same negative value as the reference ramp signal VGR.

A slope and sign selector 18 selects the ramp signal VGR for the X- or Y-axis according to whether or not a binary 1 has been stored in a flip-flop YVL and applies it to the X-deflection circuit 20 (with the proper sign) for display of a vector on a cathode-ray tube 21 with a proper slope from 0° to ±45° from the axis of the larger component. The processor 10 stores a binary 1 in the flip-flop YVL if the larger component is along the Y-axis i.e., if the magnitude of the X-component is larger than the Y-component. Thus, if the flip-flop YVL is set, the ramp signal VGR derived directly from the ramp generator is selected for the Y-deflection circuit 20. The other ramp signal MDR derived from the multiplying DAC is automatically directed to the X-deflection circuit 19. If the flip-flop YVL is reset, the ramp signals VGR and MDR are interchanged.

The slope and sign selector 18 includes an inverter to provide analog components $\overline{VGR}$ and $\overline{MDR}$ of the ramp signals, and logic to select one of each pair of complementary ramp signals to the X- and Y-deflection circuits according to the signs of the larger and smaller components stored in the respective flip-flops VSL and VSS. In the preferred embodiment to be described with reference to FIG. 4, the true and false outputs of the flip-flop YVL are combined with the true and false outputs of the sign flip-flops VSS AND VSL to select the proper one of complementary pairs of the ramp signals VGR and MDR for the X- and Y-deflection circuits.

As the ramp signal VGR derived directly from the ramp generator 16 increases from a negative value and passes through zero, a video control unit 22 detects the time of zero crossing and generates an unblanking signal until the ramp signal VGR exceeds the voltage analog of the number stored in the L-register 14. At that time, the unblanking signal for the cathode-ray tube 21 is terminated, and generation of the reference ramp signal is terminated, but its attained level is retained until a TXB command signal is received from the data processor.

Figure 2:
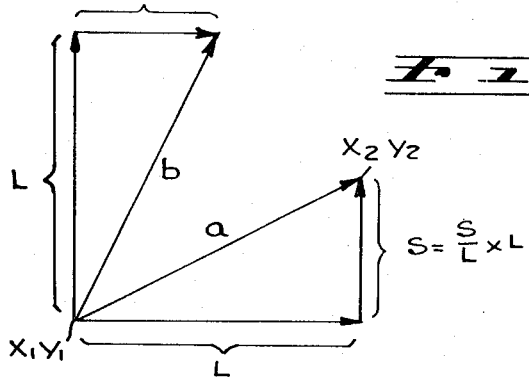
FIG. 2 is a vector diagram useful in understanding the present invention.
Figure 2:
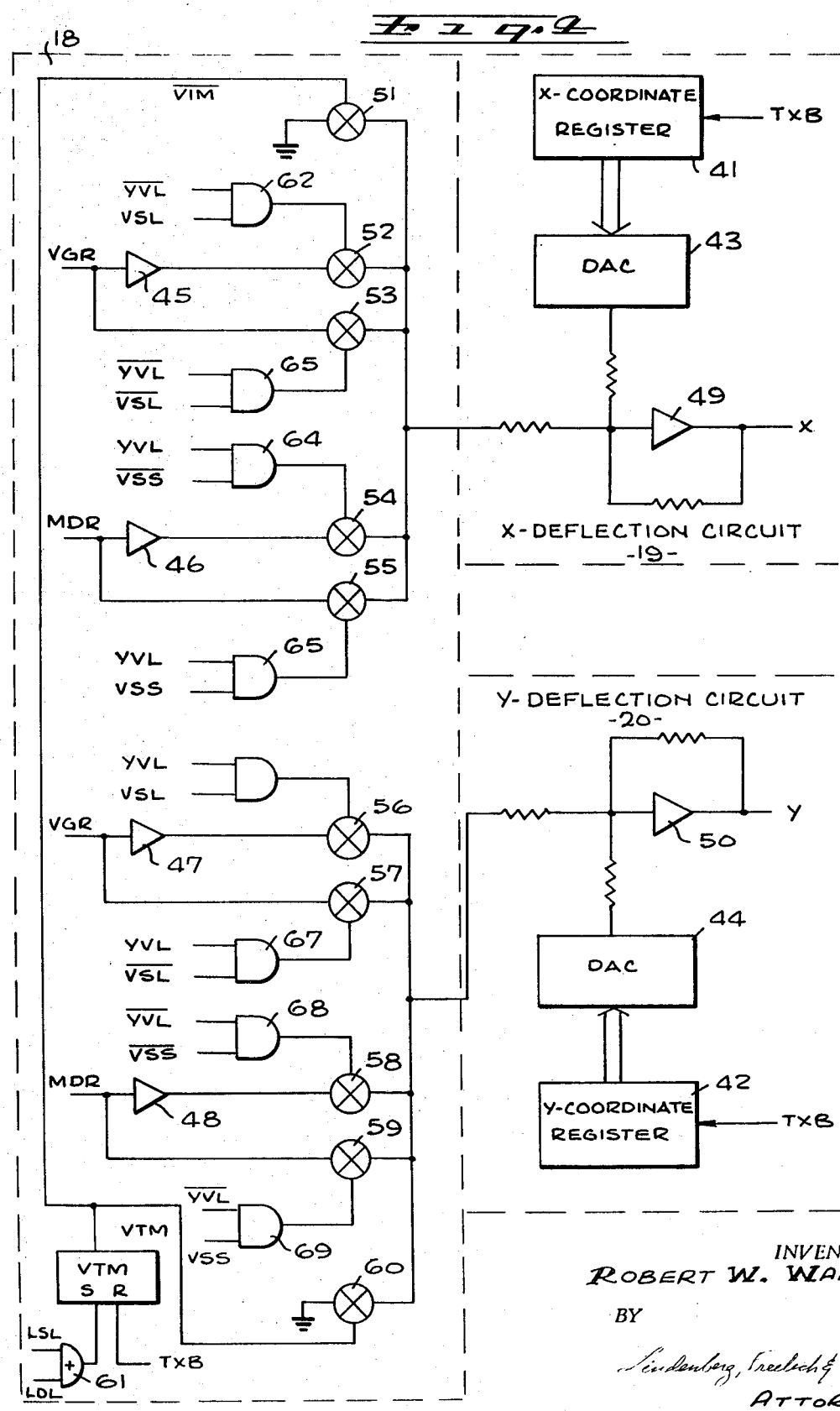

A vector diagram illustrated in FIG. 2 will assist in understanding the manner in which the ramp signal VGR employed for the larger component can be multiplied by the ratio R of the smaller component to the larger component to obtain the ramp signal MDR for the smaller component. Assuming a starting point $X_1$, $Y_1$ for a vector terminating at a point $X_2$, $Y_2$, the length of a larger component is obviously $X_2-X_1$, and is positive.

The length of the larger component L of the vector may be represented by a 13-bit number (12-bit magnitude and 1-bit sign). The length of the smaller component S (equal to $Y_2-Y_1$) is also positive and may be similarly represented by a 13-bit number. However, in accordance with the present invention, the length of the smaller component is not entered in the system of FIG. 1. Instead, the processor computes the ratio R of the smaller component S to the larger component L, and enters that ratio as a 12-bit absolute number in the R-register 15.

The sign of the smaller component is entered in the flip-flop VSS while a bit is entered in the flip-flop YVL to specify the axis of the larger component. In the case of the vector a, a binary 0 is entered in the flip-flops VSS and YVL indicating that the sign of smaller component is positive, and that the axis of the larger component is not along the Y-axis. In the case of the vector b, the absolute magnitude L of the larger component and the ratio R are similarly determined and entered in the L-registers and R-registers with the respective signs of the larger and smaller components in the flip-flops VSL and VSS. However, for the vector b, the larger component is along the Y-axis. Therefore, a binary 1 is entered in the flip-flop YVL.

If ramp signals having slopes proportional to the larger and smaller components of the vector a are applied to the appropriate X- and Y-deflection circuits, the vector a is displayed. By interchanging the ramp signals to the deflection circuits in response to a binary 1 in the flip-flop YVL, the vector V is displayed. It is evident that by varying the ratio R of the small component to the large component, and properly setting the flip-flop YVL, a vector can be displayed at any angle within the first quadrant. With the additional ability to assign the signs of the larger and smaller components, a vector at any angle in any quadrant can be displayed.

The larger component of the vector is entered into the L-register from the bus 13 under control of a programmed processor command LDL. The sign of the larger component is entered into the flip-flop VSL by the same command. For example, in a processor having an 18-bit word (bits zero to 17 in decreasing order of significance) the magnitude of the larger component may be entered from bits 6 through 17 of the bus 13 while the sign is entered in the flip-flop VSL from bit position 5 of the bus. The ratio R and the sign of the smaller component are similarly entered in the R-register and the flip-flop VSS from the bus 13 under control of a processor command LSL. At the same time, the command LSL also loads the proper indicator bit into the flip-flop YVL from bit position 4. To be able to accomplish all that with the command LSL, the processor will have previously composed the word to be thus entered in the R-register and flip-flops VSS and YVL. The 14-bit numbers (13-bit magnitude and 1-bit sign) representing the rectangular Cartesian coordinates X and Y of the starting point are similarly entered in the X- and Y-registers in response to program commands LDX and LDY.

Referring to FIG. 3, the ramp signal VGR is generated by an integrator comprising an operational amplifier 25 having a feedback capacitor 26 and an input resistor connected to a source of constant positive potential (+V) by an analog switch, such as a resistor 27 by a switch 28 (selected by a decoder 70 to maintain beam deflection speed constant in a manner to be described hereinafter). The amplifier 25 is biased to start the ramp signal VGR at a slightly negative potential once an analog switch 29 (provided to discharge the capacitor 26) has been opened and the switch 28 has been closed. The components 25 to 27 then integrate in a positive direction until the ramp signal VGR reaches a threshold specified by an analog signal from a 12-bit digital-to-analog converter 30 which receives the 12-bit magnitude of the larger component from the L-register (FIG. 1). The excursion of the ramp signal between the zero-voltage crossing point and the threshold level represents the value of the larger component of the vector. The rate at which the signal VGR reaches that threshold level is then the rate at which the electron beam is deflected along the axis selected for the largest component by logic network of the slope and sign selector 18 (FIG. 1) to be described with reference to FIG. 4.

The ramp signal MDM representing the smaller component of the vector is derived from the ramp signal VGR using the multiplying DAC as described hereinbefore with reference to FIG. 1. Accordingly, the ramp signal for the smaller component is always synchronized with the ramp signal VGR for the larger component. With a maximum ratio R, i.e., with a binary 1 in each of the bit positions of the R-register, the ramp signal MDR will have the same slope as the ramp signal VGR for display of a vector at 45° from the axis selected for the larger component. When the components are equal for this maximum ratio, the processor 10 (FIG. 1) may be programmed to designate either of the components as the larger one. With a binary zero in each bit position of the R-register, the ramp signal MDR will be zero for display of a vector along the axis of the larger component.

The analog switch 28 is controlled by a flip-flop ION to switch the current into the amplifier 25 while the analog switch 29 is open. A flip-flop IDP controls the analog switch 29 to discharge a capacitor 26 when the programmed command TXB transfers X- and Y-coordinates from the X-register to the X-deflection and Y-deflection circuits in preparation for displaying a new vector, thus marking the end of the current vector sequence.

To start the ramp generator the programmed command LDL resets the flip-flop IDP and sets the flip-flop ION. That closes the analog switch 28 and simultaneously opens the analog switch 29. During the active period of the ramp generator, the flip-flop ION transmits a signal VTRB back to the processor to indicate that the vector generator is busy. While the signal VTRB is present, the data processor can be loading output data buffer registers in preparation for the next command TXB.

A comparator 31 of the video control unit 22 compares the output of the integrator with zero to provide a binary 1 signal at its output terminal as soon as zero crossing is detected. A comparator 32 continually compares the threshold value from the digital-to-analog converter 30 to provide a binary 1 signal at its output terminal as long as the threshold value exceeds the value of the ramp signal VGR. An AND-gate 33 connected to the comparators 31 and 32 thus provides an unblanking control signal at its output terminal from the time the comparator detects zero crossing of the ramp signal VGR until the ramp signal VGR exceeds the threshold value from the digital-to-analog converter 30. The instant the comparator 32 detects that the signal VGR exceeds the threshold value, its output terminal goes from binary 1 to binary 0, and the flip-flop ION is reset. Accordingly, the output of the integrator remains at the threshold value from the digital-to-analog converter 30 until the programmed command TXB sets the flip-flop IDP to close the analog switch 29.

Referring now to FIG. 4, the X- and Y-deflection circuits include buffer registers 41 and 42 for storing the Z- and Y-coordinates entered in response to the command signal TXB in order to free the X- and Y-registers (FIG. 1) for the processor 10 to prepare for the next vector by storing its starting point coordinates while the ramp signals for the present vector are being generated. In practice, the starting point for the next vector is the end point of the present vector. Accordingly, the final ramp levels for the present vector are retained until the coordinates for the new starting point are entered. In that way the electron beam is held in proper starting position for the new vector display.

The 13-bit magnitude numbers in the X- and Y-buffer registers 41 and 42 are converted by respective digital-to-analog converters 43 and 44. The polarities of the starting point coordinate signals from the analog-to-digital converters are controlled by the sign bits of the respective X- and Y-coordinates in the buffers 41 and 42.

In a preferred implementation of the slope and sign selector 18 shown in FIG. 4, amplifiers 45 and 46 invert the signals VGR and MDR for use in the X-deflection channel while the amplifiers 47 and 48 invert the respective signals VGR and MDR for use in the Y-deflection channel. Analog switches 51 to 60 control currents to summing junctions of operational amplifiers 49 and 50 in the X- and Y-deflection circuits. In the case of the analog switches 51 and 60, a signal VTM from the false output terminal of a vector mode flip-flop $\overline{VTM}$ closes them to shunt current from the remaining switches 52 to 59 to circuit ground when the vector mode flip-flop has been reset by the programmed command TXB to inactivate the slope and sign selector. When either a programmed command LDL or LSL is executed by the processor to load respective L- and R-registers, the vector mode flip-flop VTM is set via an OR-gate 61 that opens the switches 51 and 60 to reactivate the slope and sign selector.

Once the slope and sign selector has been activated, the sign bits stored in the flip-flops VSL and VSS become effective to select a ramp signal of appropriate polarity for the X- and Y-deflection circuits. The output of the flip-flop YVL (which indicates whether the Y-component is larger than the X-component) determines which ramp signal is to be fed to the X- and Y-deflection circuits. For example, if the Y-component is larger, a binary 1 stored in the flip-flop YVL enables AND-gates 66 and 67 in the Y-channel and AND-gates 64 and 65 in the X-channel. Conversely, if the X-component is larger, a binary zero stored in the flip-flop YVL enables the AND-gates 62 and 63 in the X-channel and AND-gates 68 and 69 in the Y-channel.

The flip-flops VSL and VSS storing the signs of the larger and smaller vector components are applied to the AND-gates 62 through 69 to select the proper polarity of the ramp signal selected for the X- and Y-deflection circuits. For example, if the larger ramp signal VGR is selected for the X-deflection circuit, a binary 0 is stored in the flip-flop YVL and both gates 62 and 63 are enabled. However, only one gate transmits a signal to turn on an analog switch according to the signal VSL representing the sign of the larger component. For example, the binary 1 is stored in the flip-flop VSL indicating that the larger component is negative, only the enabled AND-gate 62 transmits a signal, thereby closing only the analog switch 52. On the other hand, if a binary 0 is stored in the flip-flop VSL, only the AND-gate 63 transmits a signal to close the analog switch 53, thereby transmitting to the X-deflection channel the uninverted ramp signal VGR.

In this example of the ramp signal VGR being selected for the X-deflection circuit by the signal $\overline{YVL}$, the other ramp signal MDR to the Y-deflection circuit is transmitted to either the analog switch 58 or the analog switch 59, depending upon the sign (signal VSS) of the smaller vector component applied to AND-gates 68 and 69. Thus, if the sign bit stored in the flip-flop VSS is a binary 0 for a positive vector component, the AND-gate 68 transmits a signal to close the switch 58, thereby inverting the negative ramp signal MDR from the multiplying DAC to a positive ramp signal for a positive vector component along the Y-axis. Conversely, if a binary 1 is stored in the flip-flop VSS for a negative component, the AND-gate 69 transmits a signal to enable the analog switch 59 to transmit the negative slope signal MDR directly to the Y-deflection circuit.

It is evident that if the ramp signal VGR is selected for the Y-deflection circuit by the signal YVL, AND-gates 66 and 67 respond to the sign of the larger component as stored in the flip-flop VSL to select the polarity of the ramp signal VGR. Meantime, the AND-gates 64 and 65 respond to the sign of the smaller component as stored in the flip-flop VSS to select the polarity of the ramp signal MDR.

If a noninverting multiplying DAC is used instead of the inverting multiplying DAC suggested hereinbefore, the control signals VSS and $\overline{VSS}$ from the flip-flop VSS would be interchanged on the paired gates 64 and 65, and on the paired gates 68 and 69. Those are the paired AND-gates associated with the selection of the polarity for the ramp signal MDR in the X- and Y-deflection channels.

Although particular embodiments of the invention have been described and illustrated herein, it is recognized that modifications and variations may readily occur to those skilled in the art and consequently it is intended that the claims be interpreted to cover such modifications and equivalents. if a binary 1 is stored in the flip-flop VSS for a negative component, the AND-gate 69 transmits a signal to enable the analog switch 59 to transmit the negative slope signal MDR directly to the Y-deflection circuit.

It is evident that if the ramp signal VGR is selected for the Y-deflection circuit by the signal YVL, AND-gates 66 and 67 respond to the sign of the larger component as stored in the flip-flop VSL to select the polarity of the ramp signal VGR. Meantime, the AND-gates 64 and 65 respond to the sign of the smaller component as stored in the flip-flop VSS to select the polarity of the ramp signal MDR.

If a noninverting multiplying DAC is used instead of the inverting multiplying DAC suggested hereinbefore, the control signals VSS and $\overline{VSS}$ from the flip-flop VSS would be interchanged on the paired gates 64 and 65, and on the paired gates 68 and 69. Those are the paired AND-gates associated with the selection of the polarity for the ramp signal MDR in the X- and Y-deflection channels.

It should be noted that the beam position will lag the ramp deflection signals by a fixed time determined by the time constants of the deflection circuits. That time constant is significant, particularly for a magnetically deflected CRT. To compensate for that, the unblanking signal is delayed (by a device assumed to be contained within the functional block shown as the CRT 21 in FIG. 1), thereby delaying the turn-on and turn-off of video by a constant amount in a conventional manner.

During the startup period of beam deflection, there is not only this lag which can be easily compensated, but also a difference in velocity between what is called for by the component ramp signals and what is produced by the deflection circuits. This difference can cause teardropping and bending at the start of a displayed vector. To overcome this problem, the ramp signals are started below zero. By the time the reference ramp signal crosses zero, beam deflection velocity will be up to that called for by the ramp signals. Consequently, unblanking is not initiated until the zero crossing is detected. However, it should be noted that the velocity called for will be different for vectors of different ratios since the length of the vector increases as the ratio increases. The maximum difference possible with a vector generated in accordance with the present invention is vectors having a ratio of not significant for visual display on a CRT because of the inability of the eye to perceive the maximum difference in light intensity produced by the electron beam impinging on the phosphorous screen of the CRT. However, if the display system is to be employed to record on film information produced by the data processor, thereby permitting high-speed preparation of detailed engineering drawings or graphic presentation of complex technical data, it is desirable to maintain film exposure approximately constant.

In visual display systems it is common practice to compensate for variation in beam deflection speed by varying beam intensity in direct proportion to variations in speed. However, since the response of the phosphor is not a linear function of beam intensity, it is preferable to maintain beam intensity constant and to control beam deflection speed. The degree to which beam deflection speed is to be maintained constant in a preferred embodiment of the present invention is only that required to maintain exposure of a given film within a small range on the straight line portion of its exposure characteristic curve for higher and more uniform contrast.

For a vector having only one component of a given length L along one axis, beam velocity will be a minimum, while a vector having two equal components beam velocity will be a maximum unless the shape of the reference ramp signal is decreased by increasing the value of the resistor coupling the power supply voltage (+V) to the integrator of the ramp generator. That can be accomplished by decoding the ratio in the R-register and selecting a proper coupling resistor. If done to the nth degree, for an n-bit ratio there would be $2^n$ resistors to select from, but as just noted speed control to that degree is not necessary. It has been determined that it is sufficient to divide the maximum range of slope values into three equal ranges, and to select one of three resistors 27, 27' and 27'' of appropriate value.

The length of a vector for a maximum ratio is 1.414 L. Accordingly, the maximum deviation of vector length ($\Delta L$) is 0.414 L. Since deflection speed is directly proportional to vector length for a constant slope of the reference ramp signal, the maximum deviation $\Delta s$ of deflection speed S is 0.414 S.

Dividing that deviation $\Delta s$ into three equal parts from 0 to 0.138 S, 0.139 S to 0.276 S, and 0.277 S to 0.414 S, it is possible to maintain the beam deflection speed constant by increasing the resistor selected for each part of the total range by 0.138 R. Thus, for vector lengths from L to 1.138 L a resistor of value R is selected, while for vector lengths from 1.139 L to 1.276 L a resistor of value 0.138 R is selected. It then follows that for a vector length from 1.277 L to 1.414 L a resistor of value 1.277 R is selected. The selection of a given one of the resistors 27, 27' and 27'' having values R, 1.138 R and 1.277 R is made by a corresponding one of respective switches 28, 28' and 28'' in response to respective signals A, B and C from the decoder 70. Each of the switches has as an additional control the true output signal of the flip-flop ION, as shown for the switch 28, in order that a reference ramp signal of a selected slope is not started until the flip-flop ION is set, as described hereinbefore.

The corresponding ranges of ratios for the selection of the resistor 27, 27' and 27'' are approximately 0.0000 to 0.5393 to 0.7907 and 0.7908 to 0.9999. To select the resistors strictly according to those ranges would require decoding all thirteen bits of each ratio in the R-register. To facilitate implementation, the decoder 70 may be implemented as a 4-bit decoder operating on the four most significant bits be rounding out the upper limit of the ratio range for the respective resistors 27, 27' and 27'' to decimal 0.5 (binary 0.0101), 0.8 (binary 1000 and 1.0 (binary 1010). This can be done without degrading performance since beam deflection speed is to be maintained only approximately constant. Having thus rounded out the limits, and recognizing that only four bits are required to represent decimal numbers from 0 to 10, it is evident that a 4-bit detector will suffice. The resistor 27'' is selected if either the code 1001 or 1010 is detected in the most significant bits of the R-register, while the resistor 27' is selected if either the code 0110 or 0111 or 1000 is detected, and the resistor 27 is detected if neither the resistor 27' nor the resistor 27'' is detected, i.e., if all of the codes detected for the selection of either the resistor 27' or 27'' are not true.

Although particular embodiments of the invention have been described and illustrated herein, it is recognized that modifications and variations may readily occur to those skilled in the art and consequently it is intended that the claims be interpreted to cover such modifications and equivalents. For example, although a programmable data processor is preferred, in some applications the present invention may be practiced to equal advantage by providing the vector control information through apparatus other than a programmable data processor. If in such applications it would not be convenient to compute the ratios in advance from vector component data, a digital divider may be provided to form the ratios for each vector as the vector data is entered in the registers and flip-flops.

What is claimed

1. Apparatus for control of the movement of an element along a vector in a rectangular Cartesian coordinate system having X- and Y-axes, comprising:

first and second means for separately controlling the position of said element on said surface in response to electrical analog signals at given linear rates produce movement of said element along a given vector;

means for storing an electrical signal representing the sign of the larger component of said given vector;

means for storing an electrical signal representing the ratio of the smaller vector component to said larger vector component;

means for storing an electrical signal representing the sign of said smaller component;

means for storing an electrical signal representing an indication of the axis of said larger component;

means for generating a linear electrical ramp signal of a predetermined polarity:

means connected to said generating means and to said ratio storing means for multiplying said linear ramp signal by said ratio to provide a scaled-down ramp signal;

means responsive to said axis-indication storage means for switching said linear ramp signal to one of said first and second controlling means corresponding to the axis indicated by said axis-indication storing means as the axis of the larger component of said vector, and responsive to said means for storing said electrical signal representing the sign of the larger component for selecting a polarity for said linear ramp signal to correspond with said sign of said larger component; and means responsive to said axis-indication storage means for switching said scaled-down ramp signal to the one of said first and second controlling means not selected to receive said linear ramp signal, and responsive to said means for storing said electrical signal representing the sign of the smaller component of said given vector for selecting a polarity for said scaled-down ramp signal being switched to correspond with said sign of said smaller component.

2. Apparatus as defined in claim 1 including means for storing an electrical signal representing the magnitude of the larger component of said given vector;

means for continually comparing said larger component magnitude signal with said linear ramp signal; and means responsive to said comparing means for terminating further generation of said electrical ramp signal when the magnitude of said linear ramp signal exceeds said larger component magnitude signal.

3. Apparatus as defined in claim 2 wherein said element being controlled comprises means for displaying a trace only while turned on, and said linear ramp generating means commences said linear electrical ramp signal with a polarity opposite said predetermined polarity, including means for detecting when the level of said linear electrical ramp signal crosses through zero;

means responsive to said zero-crossing detection means for turning on said trace displaying means; and means responsive to said comparing means for turning off said trace displaying means upon terminating further generation of said electrical ramp signal.

4. Apparatus as defined in claim 2 including decoding means connected to said ratio-storing means for producing at one of a plurality of output terminals a signal indicative of a range of the ratio being stored, each terminal being associated with a different range, and means connected to said terminals of said decoding means for controlling said ramp signal generating means to produce said linear electrical ramp signal with a given slope in response to a signal at one of said output terminals associated with the lowest range of said ratios, and with successively and proportionally smaller slopes in response to signals at other of said output terminals associated with respectively larger angles of said ratios, whereby the speed of said element being controlled along a vector is maintained approximately constant for all values of ratios from zero to one.

5. Apparatus as defined in claim 4 wherein the number of said terminals is three for three ranges of ratio values, and wherein said ranges of ratios are selected in such a manner as to divide the maximum possible vector length into thirds for the limits of said ranges as the ratio is increased from zero to one.

6. Apparatus for programmed control of a cathode-ray tube display system having X- and Y-deflection circuits for controlling the position of an electron beam in a Cartesian coordinate system with reference to orthogonal axes, a given vector being displayed by unblanking said beam, and moving said beam in response to synchronized electrical ramp signals applied to said deflection circuits, comprising:

programmable means for providing electrical signals representing for said given vector the magnitude of the larger of orthogonal components along said axes, the sign of said larger component, the ratio of said larger component to the other of said components, the sign of the smaller component, and an indication of the axis of the larger component;

static means for storing said signals;

means for generating a linear electrical ramp signal of a predetermined polarity;

means connected to said generating means and responsive to said ratio signal for multiplying said linear ramp signal to provide a scaled down ramp signal;

means responsive to said signal indicating the axis of said larger component for switching said linear ramp signal to one of said X- and Y-deflection circuits corresponding to the axis of said larger component, and responsive to said signal indicating the sign of said larger component for selecting a polarity for said linear ramp signal to correspond with said sign of said larger component;

means responsive to said signal indicating the axis of said larger component for switching said scaled-down ramp signal to the one of said X- and Y-deflection circuits not selected to receive said linear ramp signal, and responsive to said signal representing the sign of the smaller component for selecting a polarity for said scaled-down ramp signal being switched to correspond with said smaller component; and means responsive to said larger component magnitude signal and to said linear ramp signal for inactivating said ramp generating means when said linear ramp signal exceeds said larger component magnitude signal.

7. Apparatus as defined in claim 6 including decoding means connected to said static storing means, and responsive to said ratio stored therein, for producing at one of a plurality of output terminals a signal indicative of a range of the ratio being stored, each terminal being associated with a different range, and means connected to said terminals of said decoding means for controlling said ramp signal generating means to produce said linear electrical ramp signal with a given slope in response to a signal at one of said output terminals associated with the lowest range of said ratios, and with successively and proportionally smaller slopes in response to signals at other of said output terminals associated with respectively larger angles of said ratio, whereby the speed of said electron beam along a vector is maintained approximately constant for all values of ratios from zero to one.

8. Apparatus as defined in claim 7 wherein said terminals is three for three ranges of ratio values, and wherein said ranges of ratios are selected in such a manner as to divide the maximum possible vector length into thirds for the limits of said ranges as the ratio is increased from zero to one.

9. Apparatus as defined in claim 6 wherein said programmable means comprises a programmable digital data processor, and said static storing means comprises a binary storage means and separate digital-to-analog converting means connected to said binary storage means for said ratio signal and said larger-component magnitude signal.

10. Apparatus as defined in claim 9 including video control means for generating an unblanking signal for said cathode-ray tube while said ramp generating means is active, and said linear ramp signal is of said predetermined polarity, and wherein said linear ramp signal is initiated with a polarity opposite said given polarity.

* * * * *